US010785389B2

(12) United States Patent
    Kojima

(10) Patent No.: US 10,785,389 B2
(45) Date of Patent: Sep. 22, 2020

(54) IMAGE PICKUP APPARATUS WITH COOLING MECHANISM

(71) Applicant: CANON KABUSHIKI KAISHA, Tokyo (JP)

(72) Inventor: Yasuhiro Kojima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 36 days.

(21) Appl. No.: 16/203,834

(22) Filed: Nov. 29, 2018

(65) Prior Publication Data

US 2019/0174030 A1   Jun. 6, 2019

(30) Foreign Application Priority Data

Dec. 5, 2017   (JP) ................. 2017-233593

(51) Int. Cl.
   *H04N 5/225*   (2006.01)
   *G05D 23/19*   (2006.01)
   *G03B 17/55*   (2006.01)

(52) U.S. Cl.
   CPC ........... *H04N 5/2252* (2013.01); *G03B 17/55* (2013.01); *G05D 23/1919* (2013.01); *H04N 5/2253* (2013.01); *H04N 5/22521* (2018.08)

(58) Field of Classification Search
   CPC .................................................. H04N 5/2251
   USPC ........................................ 348/373, 375, 376
   See application file for complete search history.

(56) References Cited

U.S. PATENT DOCUMENTS

| 4,557,223 | A  | * | 12/1985 | N Gueyen | ............. | F01P 7/048 |
|           |    |   |         |          |              | 123/41.12  |
| 2014/0034267 | A1 | * | 2/2014 | Hojo | .................. | B60H 1/00457 |
|           |    |   |         |      |                    | 165/51 |
| 2015/0285559 | A1 | * | 10/2015 | Nagai | ..................... | G01J 5/029 |
|           |    |   |         |       |                      | 348/83 |
| 2016/0295096 | A1 | * | 10/2016 | Lever | ................. | H04N 5/23209 |

FOREIGN PATENT DOCUMENTS

JP         2007183746 A      7/2007

* cited by examiner

*Primary Examiner* — Anthony J Daniels
(74) *Attorney, Agent, or Firm* — Rossi, Kimms & McDowell LLP

(57) ABSTRACT

An image pickup apparatus which is capable of efficiently cooling itself using a general-purpose ice pack so as to be able to shoot without heating an exterior surface thereof to a high temperature even under a high temperature environment. A cooling unit of the image pickup apparatus has a first duct having an inlet, a second duct connected to the first duct, and a third duct having an outlet and connected to the second duct. The second duct is thermally connected to a first heat source, the third duct is thermally connected to a second heat source that generates a larger amount of heat than the first heat source, and air taken in through the inlet passes through the first duct, the second duct, and the third duct in this order and is discharged through the outlet.

14 Claims, 10 Drawing Sheets

IMAGE PICKUP APPARATUS WITH COOLING MECHANISM

BACKGROUND OF THE INVENTION

Field of the Invention

The present invention relates to an image pickup apparatus with a cooling mechanism.

Description of the Related Art

An image pickup apparatus such as a video camera is required to be able to shoot even in a high-temperature environment. Therefore, when shooting using the image pickup apparatus in a high-temperature environment, a photographer shoots while cooling the image pickup apparatus by bringing an ice pack into contact with the image pickup apparatus.

Conventionally, there has been proposed an efficient cooling mechanism for electronic equipment using an ice pack. For example, electronic equipment is provided with a cold storage pack which stores a cold storage material having the effect of an ice pack, and a housing unit which houses the cold storage pack, and an electronic component to be cooled and the housing unit are thermally connected together by a thermal conductive member to cool the electronic component (Japanese Laid-Open Patent Publication (Kokai) No. 2007-183746).

According to Japanese Laid-Open Patent Publication (Kokai) No. 2007-183746, however, shapes of the ice pack to be used are limited because of the housing unit for the ice pack. Conventionally, at sites of shooting using video cameras, general-purpose ice packs have been used for cooling, and if ice pack shapes are limited, a problem would arise because the general-purpose ice packs cannot be used. Here, as an efficient cooling mechanism in which a general-purpose ice pack can be used, it is conceivable that, for example, an area where the ice pack and an image pickup apparatus are brought into contact with each other is provided on an exterior surface, and the exterior surface and an electronic component to be cooled are thermally connected together by a thermally conductive member. In this mechanism, however, the exterior surface is heated to a high temperature, and hence a photographer may touch a hot area of the exterior surface.

SUMMARY OF THE INVENTION

The present invention provides an image pickup apparatus which is capable of efficiently cooling itself using a general-purpose ice pack so as to be able to shoot without heating an exterior surface thereof to a high temperature even under a high-temperature environment.

Accordingly, the present invention provides an image pickup apparatus comprising a cooler configured to comprise a first duct having an inlet, a second duct connected to the first duct, and a third duct having an outlet and connected to the second duct, wherein the second duct is thermally connected to a first heat source, the third duct is thermally connected to a second heat source that generates a larger amount of heat than the first heat source, and air taken in through the inlet passes through the first duct, the second duct, and the third duct in this order and is discharged through the outlet.

According to the present invention, the image pickup apparatus is efficiently cooled using a general-purpose ice pack so as to be able to shoot without heating an exterior surface thereof to a high temperature even under a high-temperature environment.

Further features of the present invention will become apparent from the following description of exemplary embodiments (with reference to the attached drawings).

DESCRIPTION OF THE EMBODIMENTS

The present invention will now be described in detail below with reference to the accompanying drawings showing an embodiment thereof.

Figure 1A:
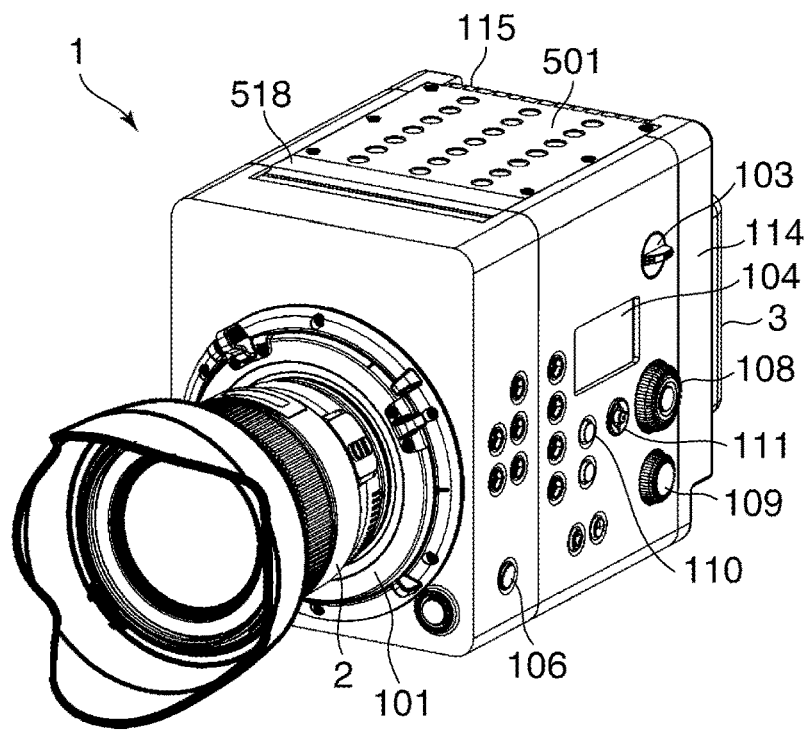
FIGS. 1A and 1B are perspective views showing an appearance of a digital video camera according to an example of an embodiment of the present invention.
Figure 1B:
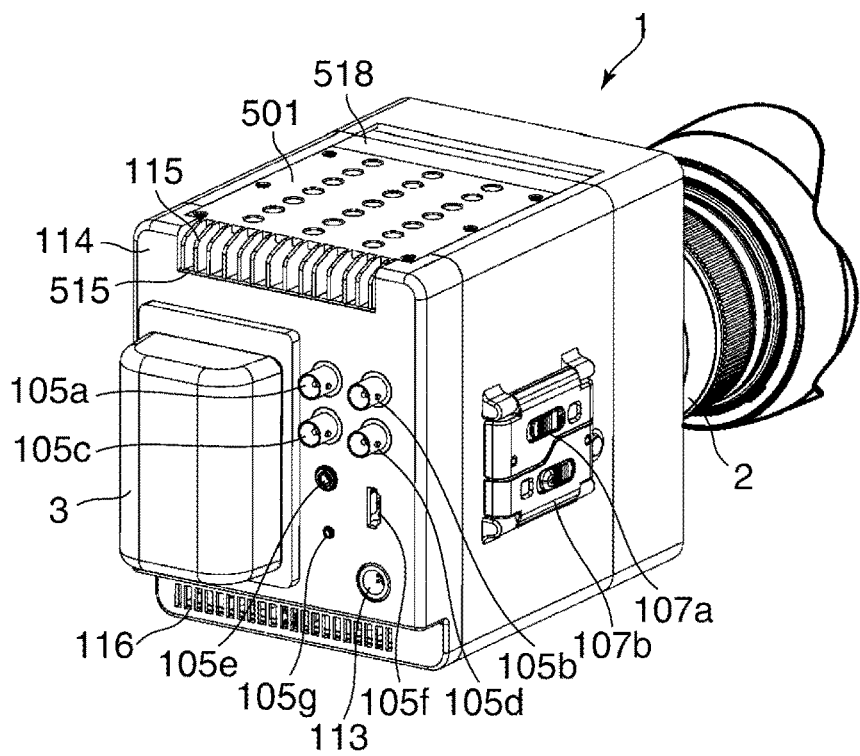

FIG. 1A is a perspective view showing an appearance of a digital video camera according to an example of the embodiment of the present invention. FIG. 1B is perspective view showing the digital video camera in FIG. 1A as seen from above and behind. It should be noted that in the present embodiment, an interchangeable-lens digital video camera (hereafter referred to as the camera) is taken as an example of an image pickup apparatus, but the present invention is not limited to this. In the following description of the present embodiment, a subject side in a direction of an optical axis of the camera is defined as front, a photographer side in the direction of the optical axis of the camera is defined rear or behind, a right side and a left side of the camera as seen from the subject side (front) are defined as right and left, respectively, a vertically upward direction of the camera is defined as upper or above, and a vertically downward direction of the camera is defined as lower or below.

As shown in FIGS. 1A and 1B, the camera 1 according to the present embodiment has a lens mount unit 101 from which an interchangeable lens 2 is removable. As will be described later with reference to FIGS. 3A and 3B, an image pickup device 701 which receives light incident from a subject is provided inside a main body to the rear of the lens mount unit 101.

A power switch 103, a display panel 104, an ISO sensitivity setting dial 108, an F-number setting dial 109, a menu button 110, a cross key 111, a REC button 106, and so forth are provided on a right side of the camera 1. Image and sound output terminals 105a to 105g, a battery 3, a power supply terminal 113, an outlet 116, and so forth are provided on a rear surface of the camera 1. Recording card slot units 107a and 107b into which card-type recording media are inserted are provided on a left side of the camera 1.

An upper exterior member 501 in which a plurality of screw holes for installing accessories is formed is placed on an upper side of the camera 1. A first inlet 115 formed by the upper exterior member 501 and a rear exterior member 114 are provided in an upper rear side of the camera 1. Forced-air cooling is implemented by taking in air through the first inlet 115 and taken out air through the outlet 116 formed in a lower side of the rear exterior member 114. The forced-air cooling will be described later in detail.

Power for driving the camera 1 is supplied from the battery 3 placed on a rear side of the camera 1. Power can also be obtained from the power supply terminal 113 if an external power supply (not shown) is connected to the power supply terminal 113.

Figure 2A:
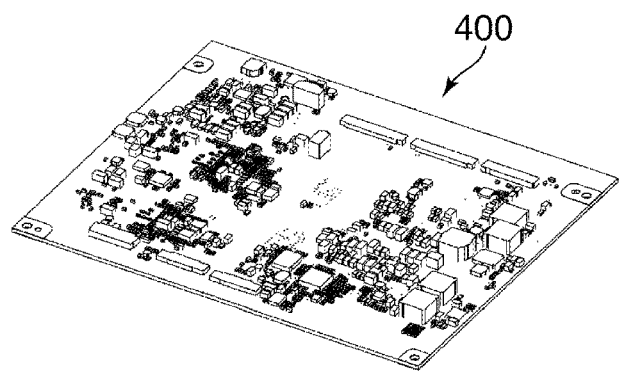
FIGS. 2A and 2B are perspective views showing a main board.
Figure 2B:
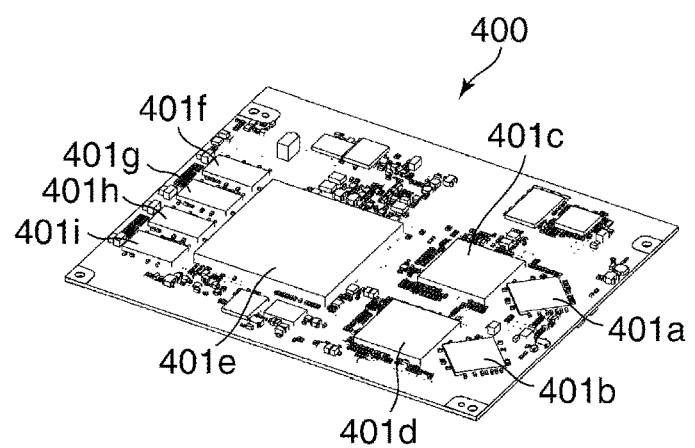

FIGS. 2A and 2B are perspective views showing a main board (circuit board) 400 provided inside the camera 1. FIG. 2A is a perspective view showing the main board 400 as seen from above, and FIG. 2B is a perspective view showing the main board 400 as seen from below. The main board 400 controls, for example, an input signal generated by an operator operating the camera 1 and processes and compresses a video signal obtained by the image pickup device 701. The main board 400 which performs such processing is one of major heat sources in the camera 1.

More specifically, as shown in FIG. 2B, control elements 401a to 401i mounted on a lower side of the main board 400 generate a particularly large amount of heat. For this reason, the control elements 401a to 401i need heat dissipation.

Figure 3A:
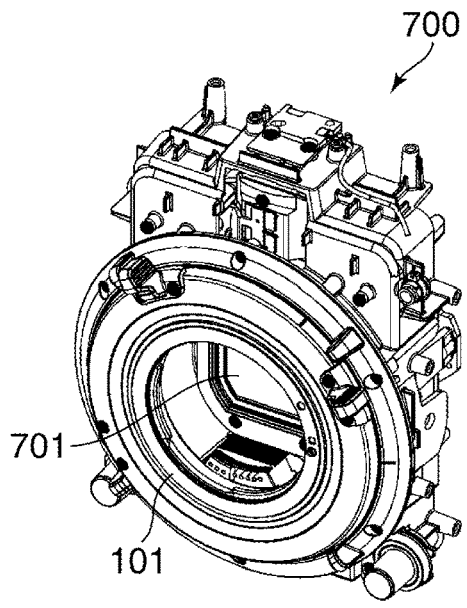
FIGS. 3A and 3B are perspective views showing an image pickup device unit.
Figure 3B:
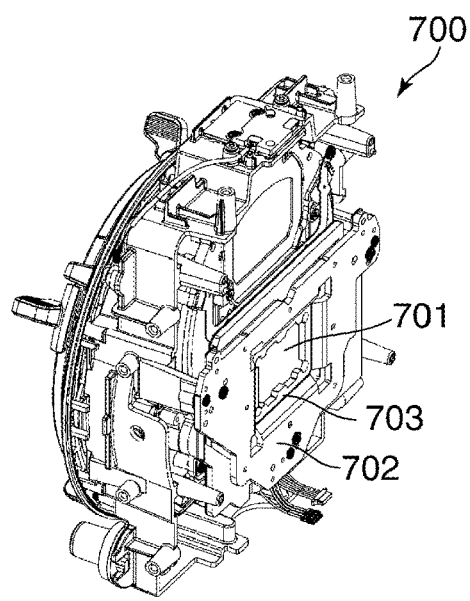

FIG. 3A is a perspective view showing an image pickup device unit 700 as seen from the front, and FIG. 3B is a perspective view showing the image pickup device unit 700 as seen from the rear. As shown in FIGS. 3A and 3B, the camera 1 is equipped with the image pickup device 701. The image pickup device 701 converts a subject image, which is formed by light from a subject passing through the interchangeable lens 2, into an electric signal. The image pickup device 701 is one of major heat sources in the camera 1 and needs heat dissipation. When the subject image is photoelectrically converted, as the temperature of the image pickup device 701 increases, noise generated in an electric signal obtained as a result tends to increase. In addition, an operation guaranteed temperature of the image pickup device 701 is usually lower than that of the control elements 401a to 401i on the main board 400. For this reason, the image pickup device 701 needs heat dissipation to a greater extent than the control elements 401a to 401i on the main board 400.

For heat dissipation of the image pickup device 701, heat-dissipating rubber 508 (to be described later with reference to FIG. 4A to 4C) needs to be brought into contact with a back side of the image pickup device 701. Accordingly, a hole-shaped portion 703 is formed in a fixing metal sheet 702, which is used to fix the image pickup device 701, by making a substantially rectangular notch in the fixing metal sheet 702. By passing the heat-dissipating rubber 508 through the hole-shaped portion 701, the heat-dissipating rubber 508 is brought into contact with the image pickup device 701 to dissipate heat of the image pickup device 701.

As described earlier, the control elements 401a to 401i, which are mounted on the main board 400, and the image pickup device 701 are the major heat sources in the camera 1. These heat sources need heat dissipation. A detailed description will now be given of a mechanism for dissipating heat thereof.

Figure 4A:
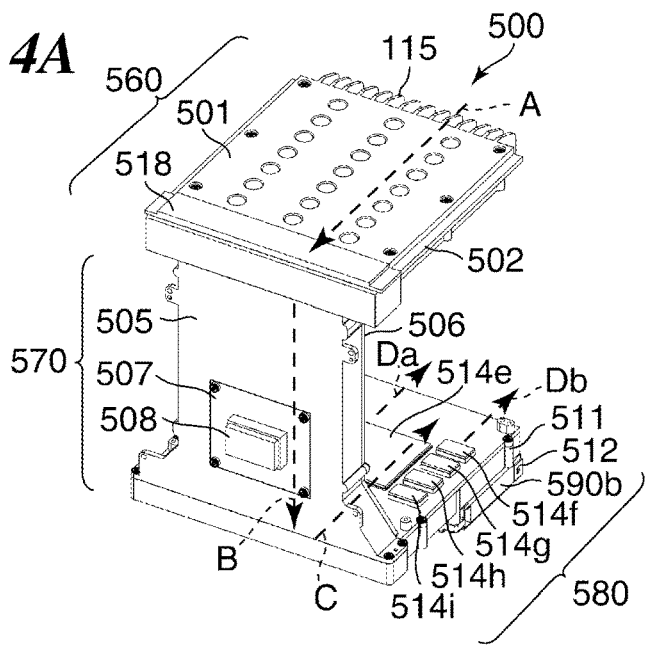
FIGS. 4A to 4C are perspective views showing a cooling unit.
Figure 4B:
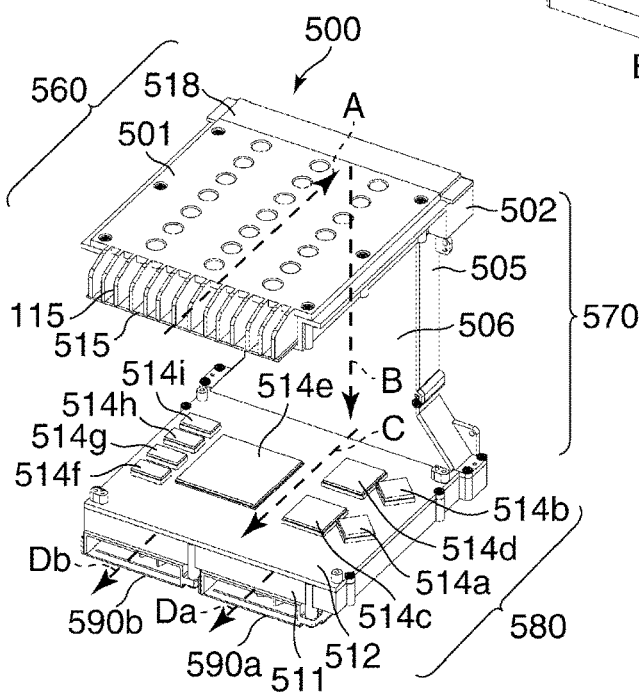
Figure 4C:
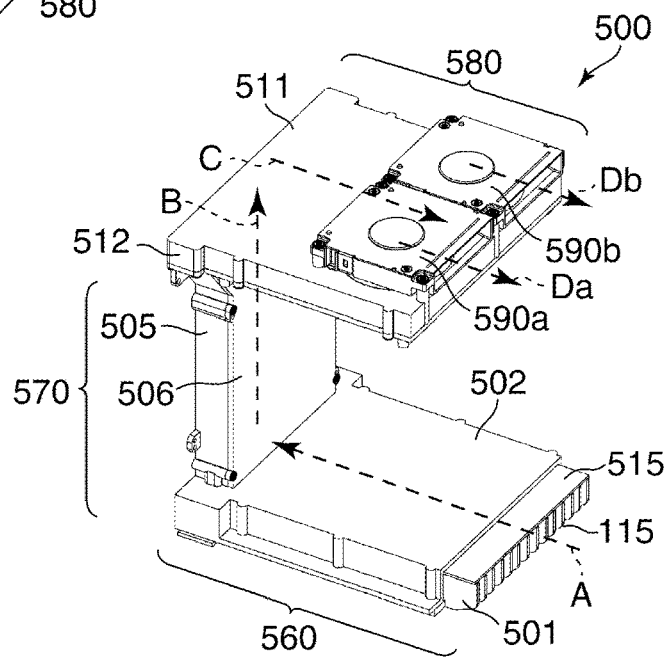
Figure 5A:
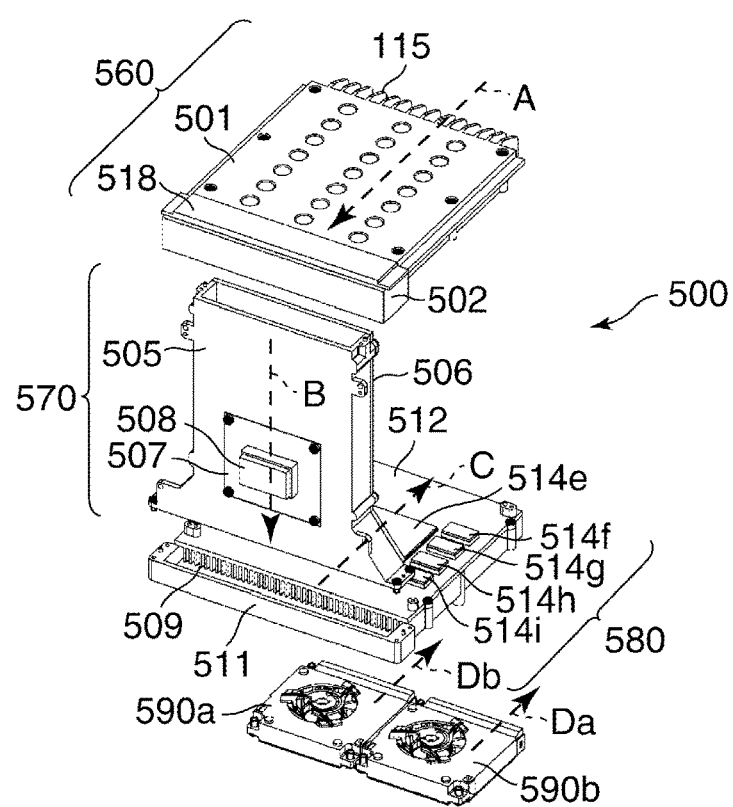
FIGS. 5A and 5B are exploded perspective views showing the cooling unit while showing ducts separately.
Figure 5B:
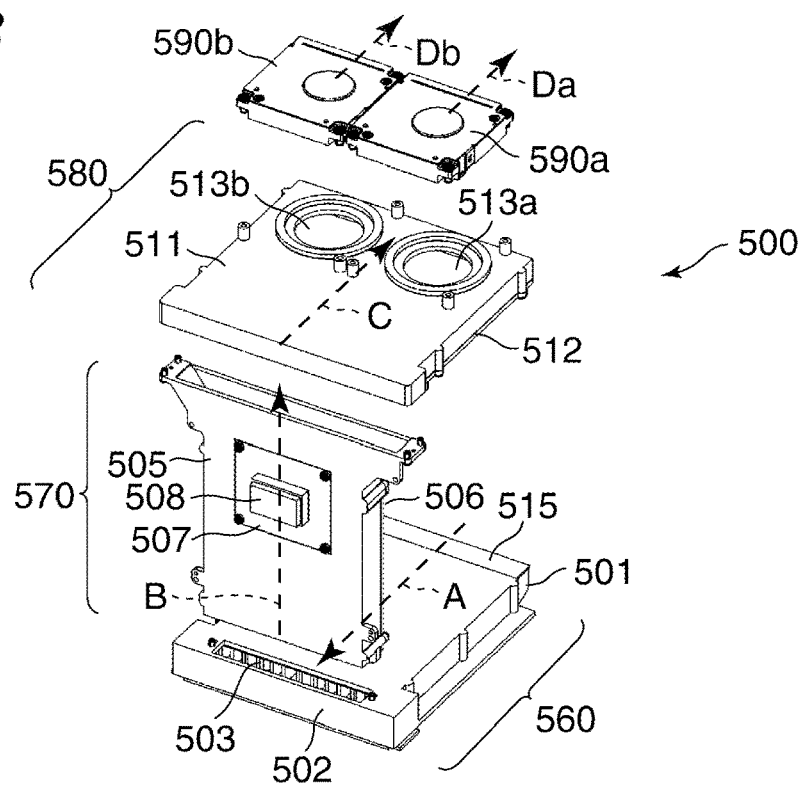

FIG. 4A is a perspective view showing a cooling unit (a cooler) 500 of the camera 1 as seen from above and front, FIG. 4B is a perspective view showing the cooling unit 500 as seen from above and behind, and FIG. 4C is a perspective view showing the cooling unit 500 as seen from below and behind. FIG. 5A is an exploded perspective view showing the cooling unit 500 of the camera 1 while showing ducts separately as seen from above and front, and FIG. 5B is an exploded perspective view showing the cooling unit 500 while showing the ducts separately as seen from below and front.

As shown in FIGS. 4A to 4C and 5A and 5B, the cooling unit 500 has a first duct 560, a second duct 570, a third duct 580, and fan units 590a and 590b. They are placed with spaces left for air to flow in the cooling unit 500. The first duct 560 and the third duct 580 are placed substantially parallel to each other, the second duct 570 is placed substantially perpendicularly to the first duct 560, and the first duct 560 and the third duct 580 are connected to the second duct 570 such that the cooling unit 500 has a substantially U-shape. A description will now be given of how the air flows.

First, the cooling unit 500 takes in air through the first inlet 115 located on the upper rear side of the cooling unit 500 and causes the air to flow in a direction along an exterior surface of the upper exterior member 501, that is, a flow path direction A through the first duct 560.

After flowing through the first duct 560, the air passes through a fixing unit opening 503 of the upper exterior member 501 while changing its flowing direction by approximately 90 degrees, and then flows through the second duct 570. In the second duct 570, the air is caused to flow from an upper side to a lower side, that is, in a direction along the image pickup device 701, that is, a flow path direction B. After flowing through the second duct 570, the air passes through an opening 509 of a lower duct member 511 while changing its flowing direction by approximately 90 degrees, and then flows through the third duct 580.

In the third duct 580, the air is caused to flow rearward along the main board 400, which generates a larger amount of heat than the image pickup device 701, that is, in a flow path direction C. After flowing through the third duct 580, the air passes through fan unit openings 513a and 513b while changing its flowing direction by approximately 90 degrees. After flowing through the fan unit openings 513a and 513b, the air is caused to change its flowing direction by approximately 90 degrees by the fan units 590a and 590b and discharged in flow path directions Da and Db.

A detailed description will now be given of the first duct 560, the second duct 570, the third duct 580, and the fan units 590a and 590b, of the cooling unit 500.

Figure 6A:
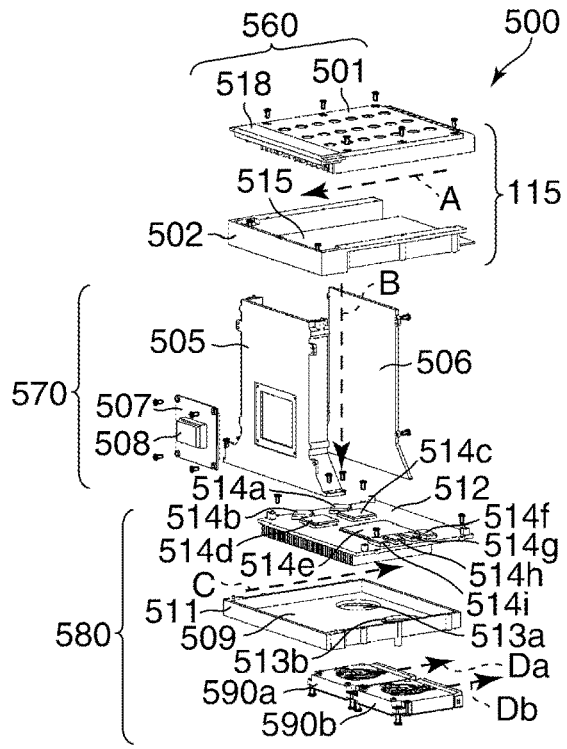
FIGS. 6A to 6C are exploded perspective views showing the cooling unit.
Figure 6B:
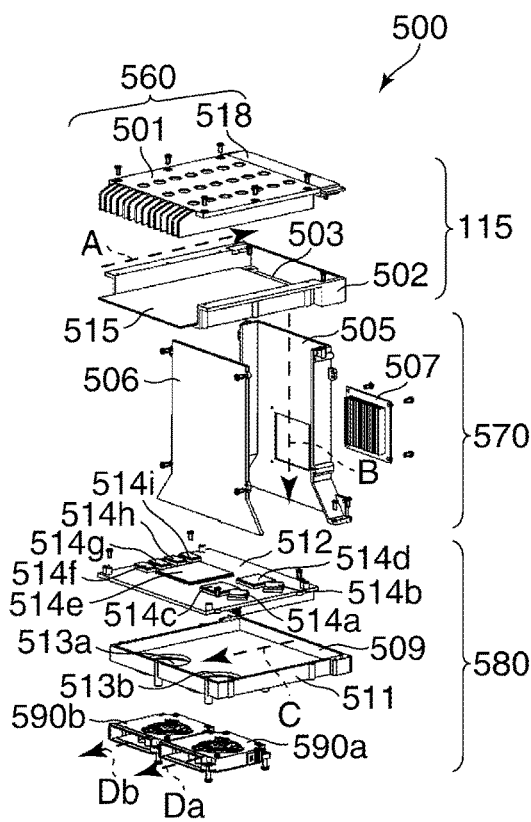
Figure 6C:
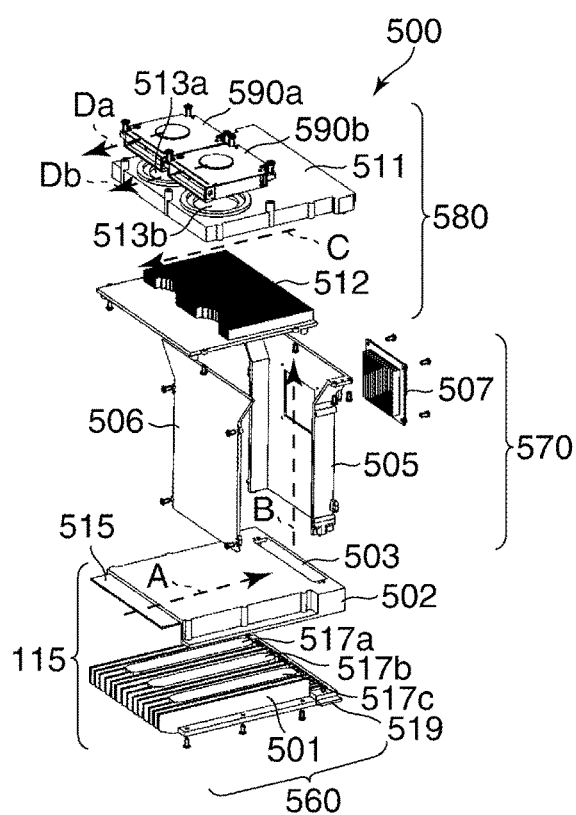

FIG. 6A is an exploded perspective view showing the cooling unit 500 as seen from above and front, FIG. 6B is an exploded perspective view showing the cooling unit 500 as seen from above and behind, and FIG. 6C is an exploded perspective view showing the cooling unit 500 as seen from below and behind.

Figure 7A:
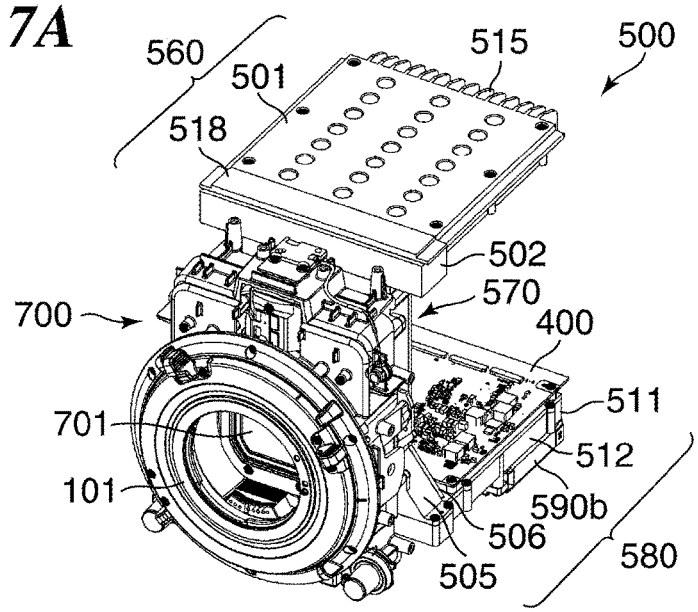
FIGS. 7A to 7C are perspective views showing a state in which the image pickup device unit and the main board are mounted on the cooling unit.
Figure 7B:
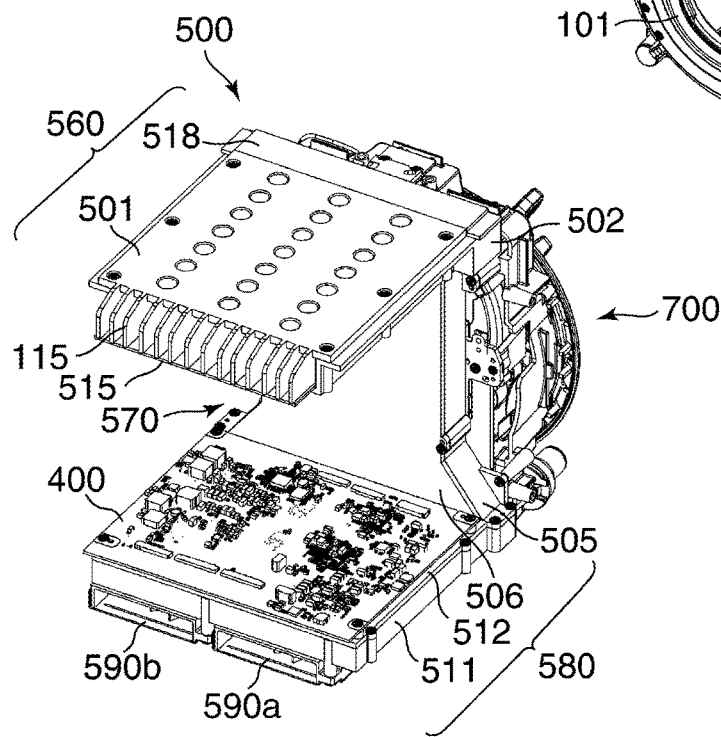
Figure 7C:
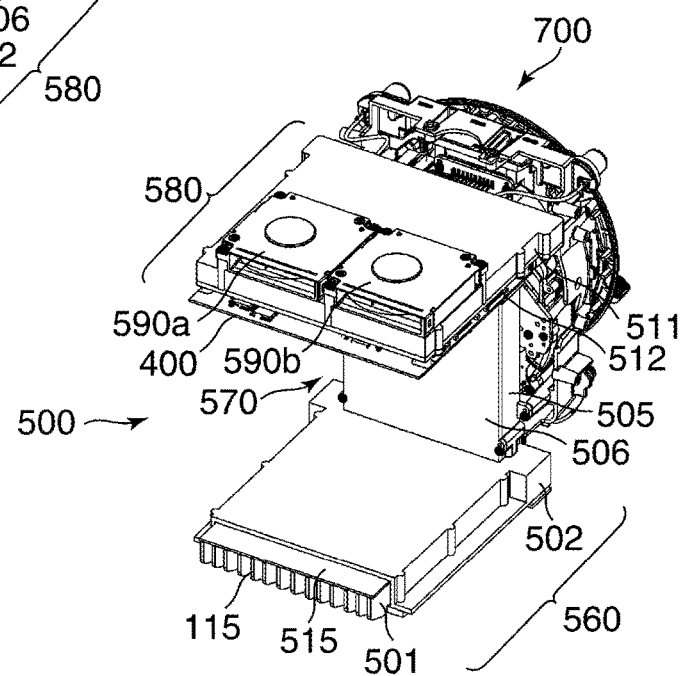

FIG. 7A is a perspective view showing a state in which the image pickup device unit 700 and the main board 400 are mounted on the cooling unit 500 as seen from above and front, and FIG. 7B is a perspective view showing the state in which the image pickup device unit 700 and the main board 400 are mounted on the cooling unit 500 as seen from above and behind. FIG. 7C is a perspective view showing the state in which the image pickup device unit 700 and the main board 400 are mounted on the cooling unit 500 as seen from below and behind.

Figure 8A:
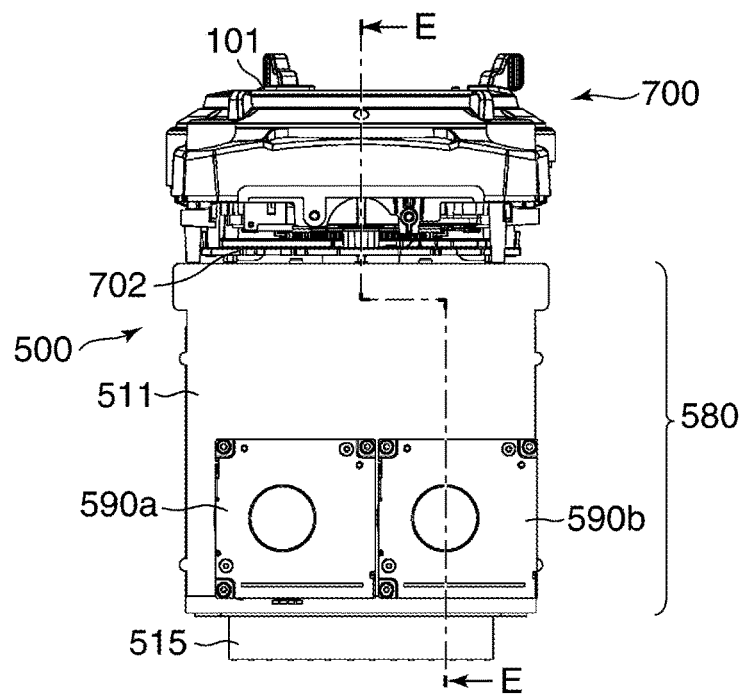
FIG. 8A is a view showing a state in which the image pickup device unit and the main board are mounted on the cooling unit.
Figure 8B:
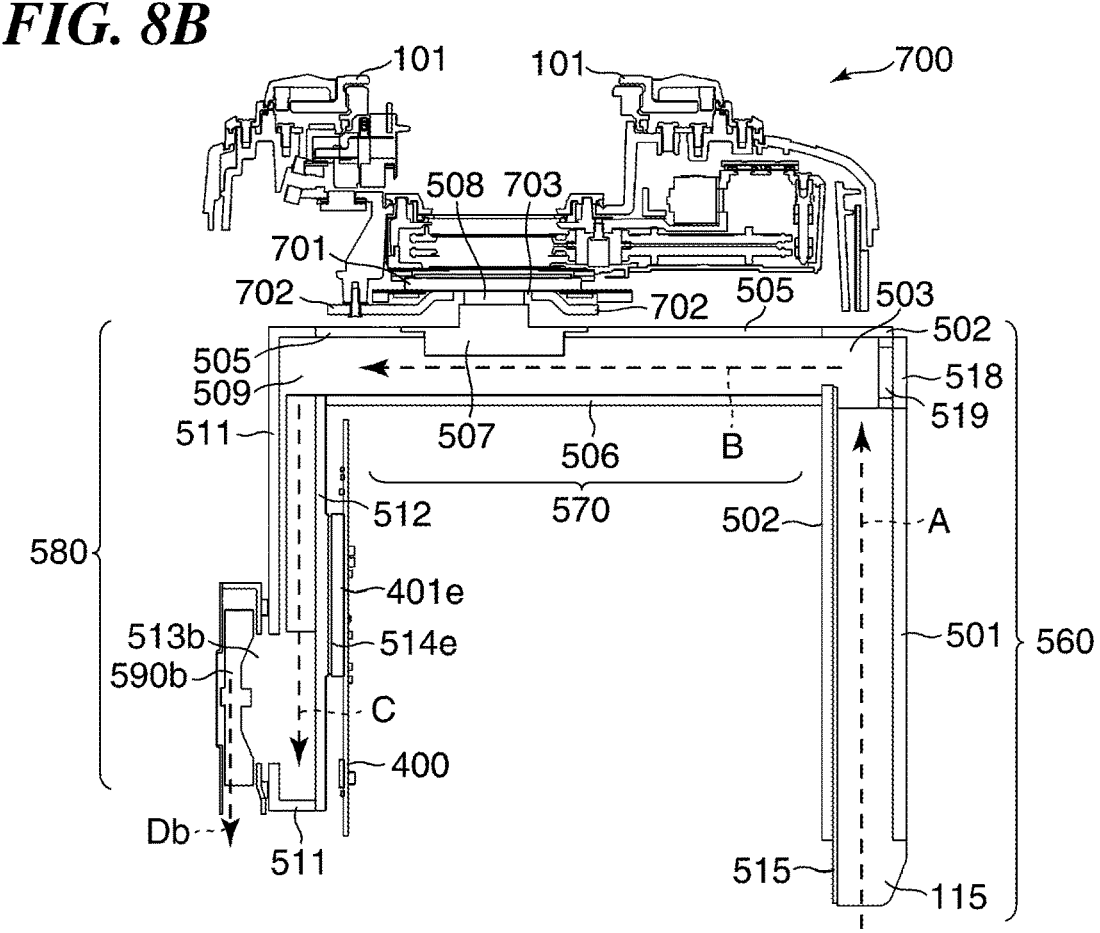
FIG. 8B is a cross-sectional view taken along line E-E of FIG. 8A.

FIG. 8A is a view showing a state in which the image pickup device unit 700 and the main board 400 are mounted on the cooling unit 500, and FIG. 8B is a cross-sectional view taken along line E-E of FIG. 8A.

As shown in FIGS. 6A to 6C, FIGS. 7A to 7C, and FIGS. 8A and 8B, the first duct 560 has the upper exterior member 501 and a fixing unit 502 that fixes the upper exterior member 501. The first duct 560 is a duct for causing the air taken in through the first intake 115, which is provided to the rear of the first duct 560, in the flow path direction A. The first duct 560 will be described later in detail.

After passing through the first duct 560, the air passes through the second duct 570 via the fixing unit opening 503 of the upper exterior member 501 as described earlier. The second duct 570 is a duct for causing the air to flow in the flow path direction B and also a duct for cooling the image pickup device 701. Accordingly, the second duct 570 is comprised of an upper duct member 505, a lid unit 506 for the upper duct member 505, and an image pickup device heat sink 507.

As described earlier, the image pickup device 701 is a device that needs cooling (heat dissipation). The air cooled through the first duct 560 is caused to flow to a fin-shaped portion of the image pickup device heat sink 507 provided in the second duct 570, so as to cool the image pickup device 701. The image pickup device heat sink 507 is in contact with the heat-dissipating rubber 508 that has thermal conductivity, and the heat-dissipating rubber 508 is in contact with the image pickup device 701. With this arrangement, heat of the image pickup device 701 is transmitted to the air passing through the second duct 570, causing the image pickup device 701 to cool.

It is preferred that the image pickup device heat sink 507 is formed of a material with high thermal conductivity, and in the present embodiment, the image pickup device heat sink 507 is formed of an aluminum alloy or the like. Moreover, as described earlier, the image pickup device 701 needs cooling (heat dissipation) to a greater extent than the control elements 401a to 401i mounted on the main board 400. Accordingly, the camera 1 is configured to cool the image pickup device 701 with the air to which heat of the control elements 401a to 401i has not yet been transmitted.

After passing through the second duct 570, the air passes through the third duct 580 via the opening 509 of the lower duct member 511 as described earlier. The third duct 580 is a duct for causing the air to flow in the flow path direction C and also a duct for cooling the control elements 401a to 401i mounted on the main board 400. Accordingly, the third duct 580 is comprised of the lower duct member 511 and a heat sink 512 that is for cooling the main board 400. As described earlier, the control elements 401a to 401i are elements that need cooling (heat dissipation). The heat sink 512 has a fin-shaped portion, and the control elements 401a to 401i are cooled by the air flowing to the fin-shaped portion.

The heat sink 512 is in contact with heat-dissipating rubber 514a to 514i that has thermal conductivity, and the heat-dissipating rubber 514a to 514i is respectively in contact with the control elements 401a to 401i. With this arrangement, the control elements 401a to 401i mounted on the main board 400 are cooled.

It is preferred that the heat sink 512 is formed of a material with high thermal conductivity, and in the present embodiment, the heat sink 512 is formed of an aluminum alloy or the like. As described earlier, the operation guaranteed temperature of the control elements 401a to 401i is generally higher than that of the image pickup device 701. For this reason, even the air to which heat of the image pickup device 701 has been transmitted by passing through the second duct 570 satisfactorily cools the control elements 401a to 401i.

After passing through the third duct 580, the air is caused to flow toward the fan units 590a and 590b, which are placed on a lower side of the third duct 580, via the fan unit openings 513a and 513b as described earlier. The air is then discharged through the outlet 116 in the flow path directions Da and Db by the fan units 590a and 590b. It should be noted that in the present embodiment, sirocco fans are used as the fan units 590a and 590b so as to discharge the air rearward by changing its flowing direction by 90 degrees.

Thus, in the present embodiment, the cooling unit 500 is able to cool the image pickup device 701 and the control elements 401a to 401i mounted on the main board 400, which are the major heat sources in the camera 1.

In the present embodiment, by using a general-purpose ice pack 900, the camera 1 is able to shoot even in a high-temperature environment, and a detailed description thereof will be given below.

Figure 9A:
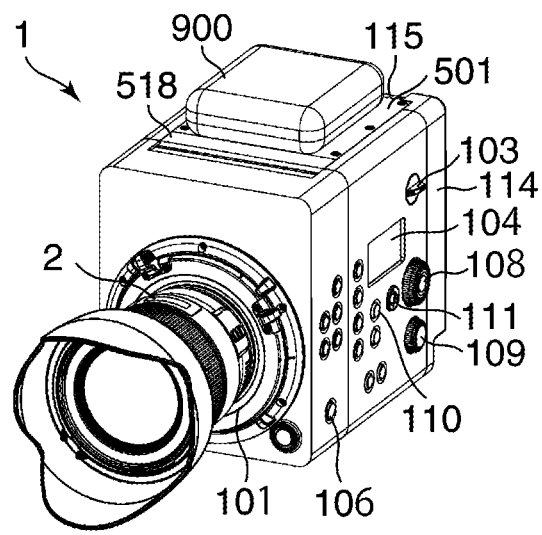
FIGS. 9A and 9B are perspective views showing a state in which an ice pack is put on an upper exterior member of the digital video camera.
Figure 9B:
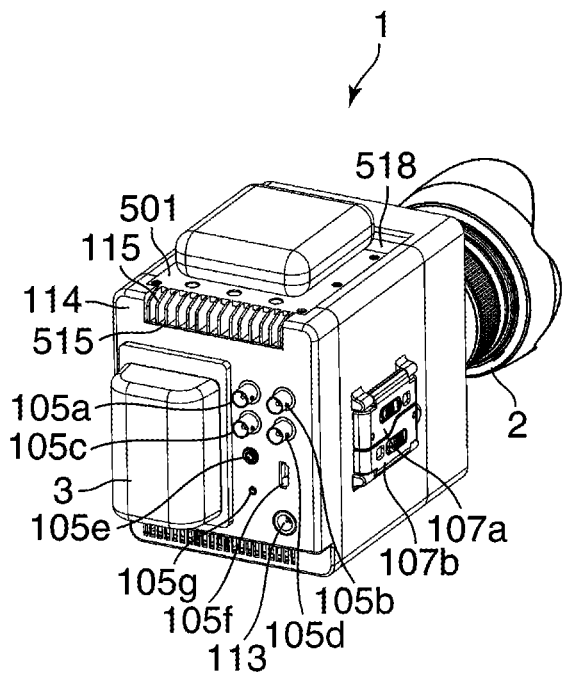
Figure 10:
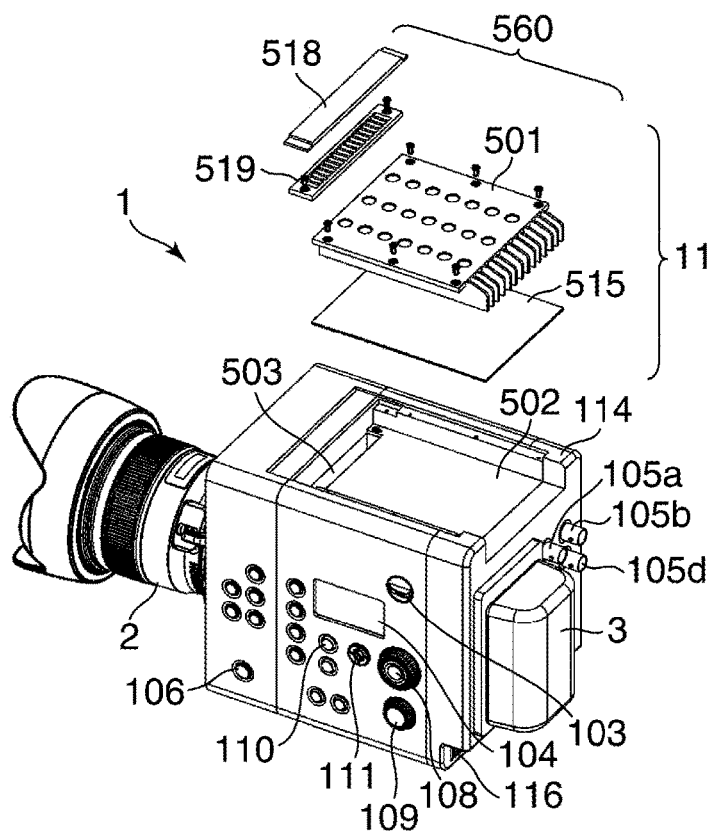
FIG. 10 is an exploded perspective view showing the upper exterior member of the digital camera and its vicinity.
Figure 11A:
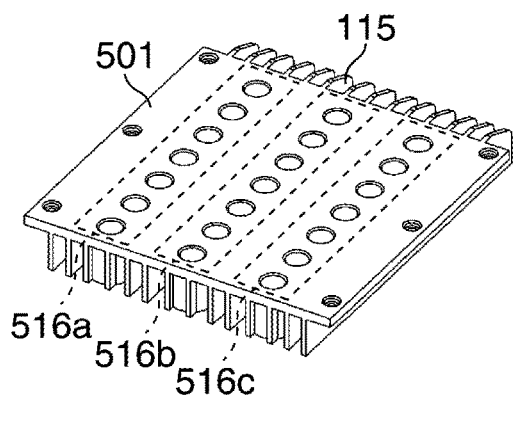
FIGS. 11A and 11B are perspective views showing the upper exterior member.

FIGS. 9A and 9B are perspective views showing a state in which the general-purpose ice pack 900 is put on the upper exterior member 501 of the camera 1. FIG. 9A is a perspective view showing the state in which the general-purpose ice pack 900 is put on the upper exterior member 501 of the camera 1 as seen from above and front, and FIG. 9B is a perspective view showing the state in which the general-purpose ice pack 900 is put on the upper exterior member 501 of the camera 1 as seen from above and behind. FIG. 10 is an exploded perspective view showing the upper exterior member 501 of the camera 1 and its vicinity as seen from above and behind. FIG. 11A is a perspective view showing the upper exterior member 501 as seen from above and front, and FIG. 11B is a perspective view showing the upper exterior member 501 as seen from below and front.

In the camera 1 shown in FIGS. 9A and 9B, the ice pack 900 which is a substantially rectangular parallelepiped is put on the upper exterior member 501 so as to perform shooting in a high-temperature environment. As shown in FIGS. 1A, 1B, 9A, and 9B, the upper exterior member 501 has a relatively large flat portion, and hence there are few limitations on shapes of the ice pack 900 to be put on the upper exterior member 501. Specifically, the ice pack 900 may be of any shape insofar as long as it does not block the first intake 115. A cooling effect is achieved when the temperature of the ice pack 900 is lower than that of a shooting environment. The lower the temperature of the ice pack 900, the higher the cooling effect. The upper exterior member 501 is located away from the main board 400 and the image pickup device 701 which are the major heat sources in the camera 1. For this reason, heat of these heat sources is not likely to be transmitted to the upper exterior member 501, and therefore, the operator or the like is not likely to feel hot when he or she touches the upper exterior member 501.

In general, as an efficient cooling method using the ice pack 900, it is conceivable that the upper exterior member 501 on which the ice pack 900 is put and the heat sources are placed close to each other, and the upper exterior member 501 and the heat sources are connected together via thermal conductive members. On the other hand, the camera 1 according to the present embodiment uses the cooling unit 500 described above. Namely, the ice pack 900 put on the upper exterior member 501 of the camera 1 cools the air taken in. The image pickup device 701 and the main board 400 which are the major heat sources in the camera 1 are efficiently cooled by the cooled air flowing through the second duct 570 and the third duct 580. Thus, according to the present embodiment, the heat sources of the camera 1 are efficiently cooled although the upper exterior member 501 on which the ice pack 900 is put and the heat sources are located away from each other. A detailed description will now be given of how the air is cooled.

Figure 11B:
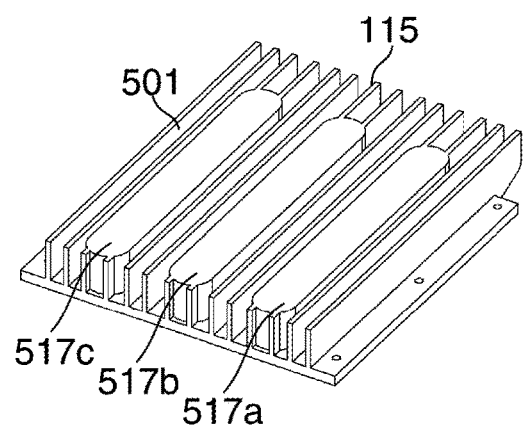

As shown in FIGS. 10, 11A, and 11B, the upper exterior member 501 has on its lower side fin-shaped portions facing downward. Cold air from the ice pack 900 is transmitted to the upper exterior member 501 through a surface of the upper exterior member 501 which is in contact with the ice pack 900. In the end, the cold air is transmitted to ends of the fin-shaped portions of the upper exterior member 501. Thus, the cooling unit 500 is configured such that while the air taken in is flowing through the first duct 560, the cold air from the ice pack 900 is likely to be transmitted to the air taken in. With this configuration, the temperature of the air that has passed through the first duct 560 is lower than that of the air immediately after it is taken in.

As the length over which the fin-shaped portions of the upper exterior member 501 increases, the distance over which the cold air is transmitted to the air increases, which makes the transmission of the cold air effective. For this reason, the fin-shaped portions are extended all the way from a rear end to a front end of the upper exterior member 501. The air that has decreased in temperature as a result of passing through the fin-shaped portions of the upper exterior member 501 flows through the second duct 570 first to cool the image pickup device 701, cooling of which is given a higher priority than that of the control elements 401*a* to 401*i*.

After that, the air flows through the third duct 580 to cool the control elements 401*a* to 401*i*. With this arrangement, the camera 1 is efficiently cooled using the ice pack 900 and is able to shoot under a high-temperature environment. Further, with this arrangement, exterior surfaces of the upper exterior member 501 resist becoming hot, and hence the operator can safely touch the exterior surfaces. It is preferred that the upper exterior member 501 is formed of a material with high thermal conductivity so as to transmit the cold air from the ice pack 900. In the present embodiment, the upper exterior member 501 is formed of an aluminum alloy or the like.

If the ends of the fin-shaped portions of the upper exterior member 501 touch the fixing unit 502 of the upper exterior member 501, heat inside the camera 1 would be transmitted to the fin-shaped portions to increase the temperature of the fin-shaped portions. This makes it difficult to cool the air passing through the fin-shaped portions of the upper exterior member 501.

To solve this problem, as shown in FIG. 10, the camera 1 is equipped with a heat insulation member 515 that is provided between a space at the end of the fin-shaped portions of the upper exterior member 501 and the fixing unit 502 of the upper exterior member 501 so as to insulate heat. The heat insulation member 515 is a spongy member. The end of the fin-shaped portions of the upper exterior member 501 and the heat insulation member 515 are in contact with each other, and the fixing unit 502 of the upper exterior member 501 and the heat insulation member 515 are in contact with each other. Namely, the heat insulation member 515 prevents the ends of the fin-shaped portions and the fixing unit 502 from coming into contact with each other, and hence heat is not likely to be transmitted between the fin-shaped portions and the fixing unit 502. Namely, heat inside the camera 1 is not likely to be transmitted to the end of the fin-shaped portions. With this arrangement, the camera 1 according to the present embodiment is able to prevent deterioration in the effect of cooling the air passing through the first duct 560.

As shown in FIGS. 11A and 11B, screw hole rows 516*a* to 516*c* each comprised of a plurality of screw insertion holes for installing accessories are formed on the upper exterior member 501. A lower hole rib-shaped portions 517*a* to 517*c* for providing threads of screw members inserted into the screw hole rows 516*a* to 516*c* are formed on a lower side (inner side) of the upper exterior member 501.

In some conventional video cameras, a plurality of screw insertion holes for installing accessories are also formed on an upper exterior member, and a space where rib-shaped portions for forming threads are installed is a dead space.

On the other hand, in the camera 1 according to the present embodiment, the fin-shaped portions are placed between the lower hole rib-shaped portions 517*a* to 517*c* so as to be utilized as the first duct 560. With this arrangement, the spaces inside the camera 1 are effectively used. Further, the lower hole rib-shaped portions 517*a* to 517*c* are also fin-shaped and thus effectively cools the air.

Figure 12A:
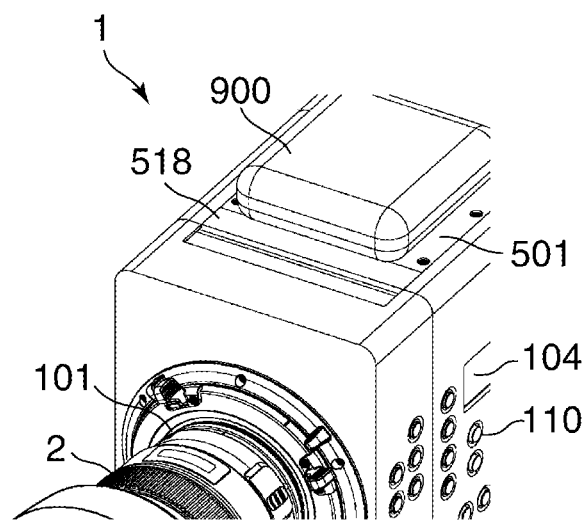
FIGS. 12A and 12B are perspective views showing a part of the digital video camera.
Figure 12B:
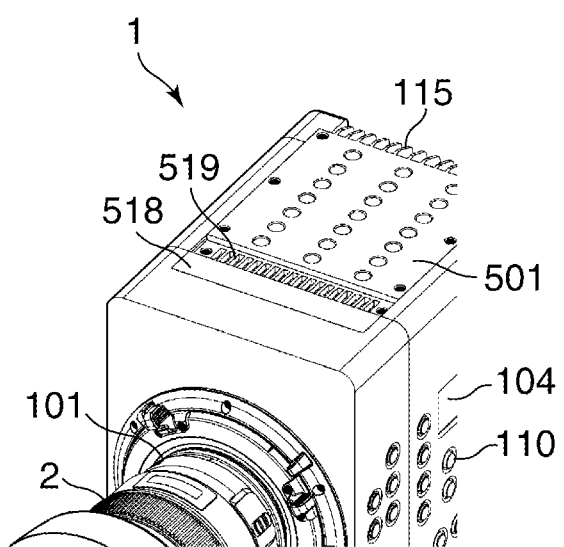

FIG. 12A is a perspective view showing a part of the camera 1 during shooting under a high-temperature environment as seen from above and front, and FIG. 12B is a perspective view showing a part of the camera 1 during shooting under a room-temperature environment as seen from above and front.

It is effective to use the first duct 560 in a case where the camera 1 is cooled with the ice pack 900 in the high-temperature environment. However, in a case where the ice pack 900 is not used in the room-temperature environment, using the first duct 560 is not only ineffective but also results in excess ventilation resistance.

As shown in FIGS. 12A and 12B, the camera 1 according to the present embodiment has a lid member 518 that covers the second inlet 519 such that the second inlet 519 is able to open and close. Sliding the lid member 518 forward causes the second inlet 519 to expose itself. When the second inlet 519 exposes itself, air is taken through the second inlet 519 as well, and hence the air taken in through the second inlet 519 is caused to flow directly to the second duct 570. Namely, with the second inlet 519 exposed, excess ventilation resistance never occurs in the first duct 560.

In the room-temperature environment, even when the ice pack 900 is not used, and the second inlet 519 does not expose itself, no problem arises in shooting. Due to the characteristics of the image pickup device 701, however, noise is reduced as the temperature of the image pickup device 701 is lowered. For this reason, when the ice pack 900 is not used, a satisfactory image can be obtained by exposing the second inlet 519 to flow the air directly to the second duct 570.

With the arrangement described above, in the camera 1 according to the present embodiment, the upper exterior member 501 never becomes hot, and moreover, shooting can be performed even in a high-temperature environment by efficiently cooling the camera 1 with the ice pack 900. The present invention thus provides the camera 1 that is efficiently cooled with the general-purpose ice pack 900 and is able to shoot even in a high-temperature environment without heating the exterior surfaces of the camera 1 to a high temperature.

It should be understood that the present invention is not limited to the illustrative embodiment described above, but materials, shapes, dimensions, forms, numbers, installation location, and so on may be arbitrarily changed without departing from the gist of the present invention.

For example, although in the present embodiment, the ice pack 900 is configured to be put on the upper exterior member 501, there may be a holding mechanism or the like for holding the ice pack 900.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent mechanisms and functions.

This application claims the benefit of Japanese Patent Application No. 2017-233593, filed Dec. 5, 2017, which is hereby incorporated by reference herein in its entirety.

What is claimed is:

1. An image pickup apparatus comprising:
    a main body;
    an image pickup device disposed in the main body and configured to receive light from a lens detachably attached to the main body and to convert the received light into an electric signal; and
    a cooler disposed in the main body and comprising a first duct having an inlet, a second duct connected to the first duct, and a third duct having an outlet and connected to the second duct,
    wherein the second duct is thermally connected to a first heat source, the third duct is thermally connected to a second heat source that generates a larger amount of heat than the first heat source, and air taken in through the inlet passes through the first duct, the second duct, and the third duct in this order and is discharged through the outlet.

2. The image pickup apparatus according to claim 1, wherein the first duct and the second duct are placed substantially perpendicularly to each other, and the second duct and the third duct are placed substantially perpendicularly to each other.

3. The image pickup apparatus according to claim 2, wherein the first duct and the third duct are placed substantially parallel to each other.

4. The image pickup apparatus according to claim 2, wherein the first duct is placed on an upper side of the image pickup apparatus, and the third duct is placed on a lower side of the image pickup apparatus.

5. The image pickup apparatus according to claim 1, wherein the first heat source includes the image pickup device.

6. The image pickup apparatus according to claim 1, wherein an exterior surface of the first duct is configured to receive an ice pack such that the ice pack contacts with the exterior surface.

7. The image pickup apparatus according to claim 1, wherein a plurality of screw insertion holes is provided on an exterior surface of the first duct.

8. The image pickup apparatus according to claim 7, wherein rib-shaped portions for forming threads of screw members to be inserted into the screw insertion holes are provided on an inner side of the exterior surface, and the rib-shaped portions are fin-shaped.

9. The image pickup apparatus according to claim 1, wherein the second duct is provided with fin-shaped portions of a heat sink.

10. The image pickup apparatus according to claim 9, wherein a second inlet is formed on the second duct closer to the first duct than the fin-shaped portions of the heat sink, and a lid member movably covers the second inlet such that the second inlet is able to be opened and closed.

11. The image pickup apparatus according to claim 1, wherein the inlet and the outlet are respectively disposed in exterior portions of the main body.

12. An image pickup apparatus comprising:
    a cooler comprising a first duct having an inlet, a second duct connected to the first duct, and a third duct having an outlet and connected to the second duct,
    wherein the second duct is thermally connected to a first heat source, the third duct is thermally connected to a second heat source that generates a larger amount of heat than the first heat source, and air taken in through the inlet passes through the first duct, the second duct, and the third duct in this order and is discharged through the outlet,
    wherein the first heat source includes an image pickup device.

13. An apparatus comprising:
    a cooler comprising a first duct having an inlet, a second duct connected to the first duct, and a third duct having an outlet and connected to the second duct,
    wherein the second duct is thermally connected to a first heat source, the third duct is thermally connected to a second heat source that generates a larger amount of heat than the first heat source, and air taken in through the inlet passes through the first duct, the second duct, and the third duct in this order and is discharged through the outlet, wherein a plurality of screw insertion holes is provided on an exterior surface of the first duct.

14. The apparatus according to claim 13, wherein rib-shaped portions for forming threads of screw members to be inserted into the screw insertion holes are provided on an inner side of the exterior surface, and the rib-shaped portions are fin-shaped.

\* \* \* \* \*